United States Patent [19]

Hale et al.

[11] 4,433,672

[45] Feb. 28, 1984

[54] SOLAR ENERGY MODULATOR

[75] Inventors: Robert R. Hale, Upland; Allan R. McDougal, La Canada, both of Calif.

[73] Assignee: The United States of America as represented by the Administrator of the National Aeronautics & Space Administration, Washington, D.C.

[21] Appl. No.: 284,286

[22] Filed: Jul. 17, 1981

[51] Int. Cl.³ .................................................. F24J 3/02
[52] U.S. Cl. .................................. 126/419; 126/438; 126/451
[58] Field of Search ............... 126/419, 420, 421, 438, 126/439, 450, 451, 424, 425; 49/31; 362/277

[56] References Cited

U.S. PATENT DOCUMENTS

| | | | |
|---|---|---|---|
| 1,751,582 | 3/1930 | Graslewicz | 362/277 |
| 2,030,350 | 2/1936 | Bremser | 126/419 |
| 3,024,700 | 3/1962 | McClellan | 126/451 |
| 3,162,189 | 12/1964 | Small et al. | 126/425 |
| 3,831,581 | 8/1974 | Baseley | 126/419 |
| 3,860,055 | 1/1975 | Wild | 126/419 |
| 4,222,367 | 9/1980 | Jubb | 126/419 |
| 4,236,383 | 12/1980 | Frosch et al. | 126/419 |
| 4,304,218 | 12/1981 | Karlsson | 126/419 |
| 4,365,615 | 12/1982 | Melvin | 126/419 |

Primary Examiner—Daniel J. O'Connor
Attorney, Agent, or Firm—Paul F. McCaul; Thomas H. Jones; John R. Manning

[57] ABSTRACT

A solar energy module characterized by a receiver 14 having a solar energy acceptance opening 22 and supported by a mounting ring 18 along the optic axis A of a parabolic mirror 12 in coaxial alignment therewith for receiving solar energy from the mirror, and a solar flux modulator plate 42 for varying the quantity of solar energy flux received by the acceptance opening of the module. The modulator plate 42 is characterized by an annular, plate-like body, the internal diameter of which is equal to or slightly greater than the diameter of the solar energy acceptance opening 22 of the receiver, and a plurality of slave cylinders 44 are connected to the modulator plate for supporting the plate for axial displacement along the axis A of the mirror for thereby variably shading the opening 22 with respect to solar energy flux reflected from the surface of the mirror to the solar energy acceptance opening.

3 Claims, 5 Drawing Figures

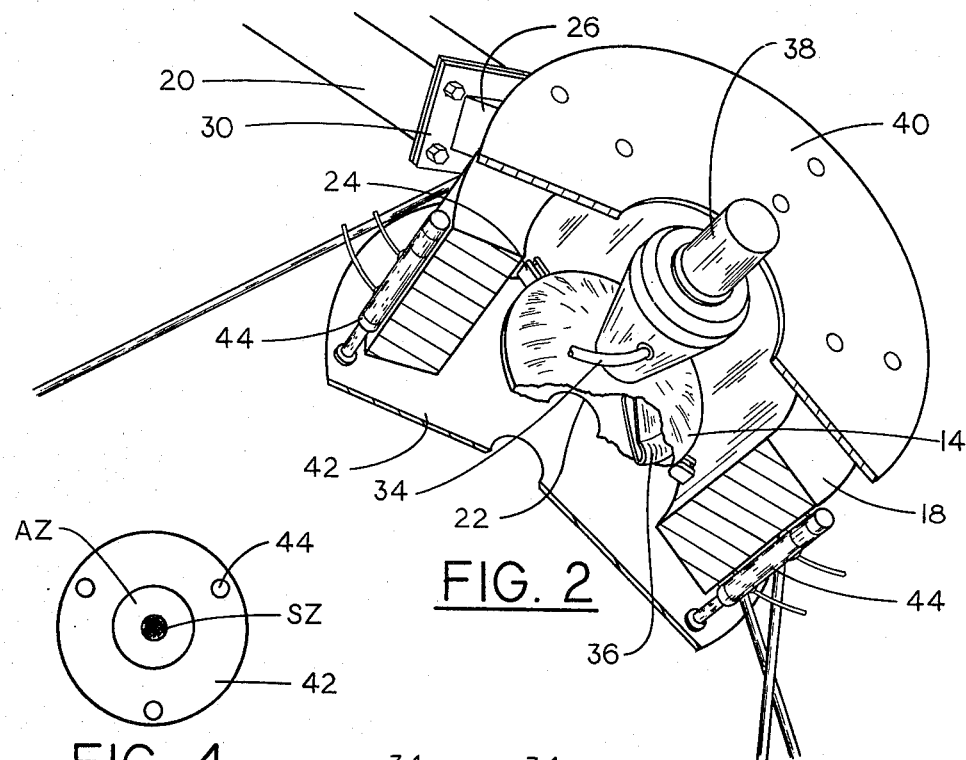
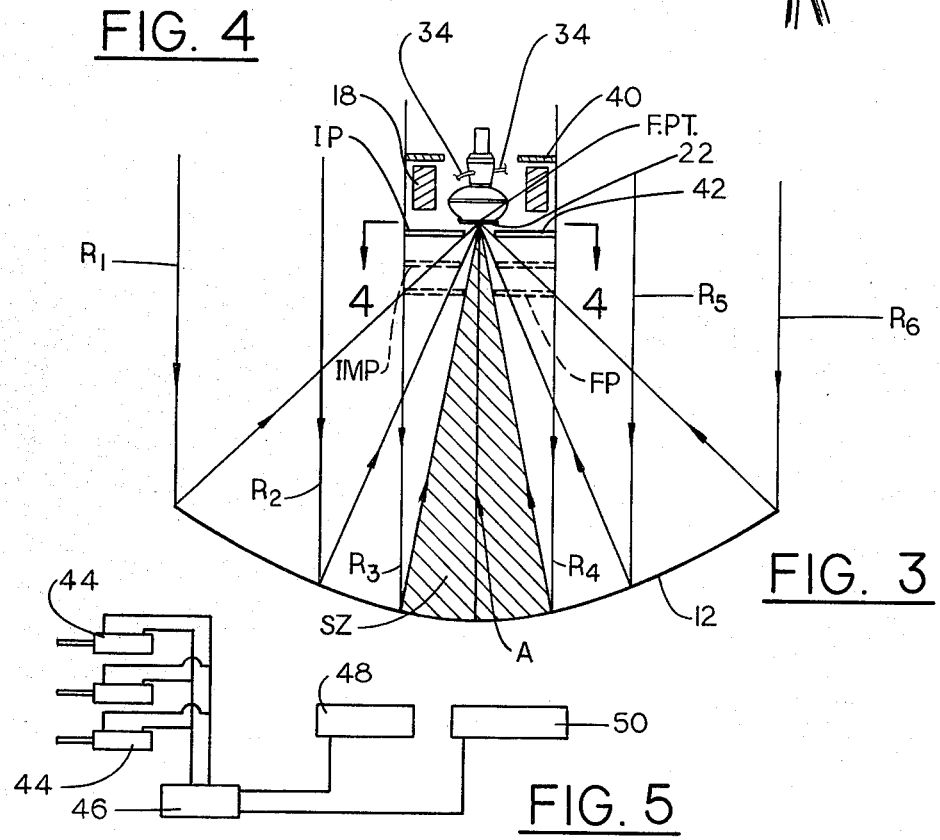

SOLAR ENERGY MODULATOR

ORIGIN OF THE INVENTION

The invention described herein was made in the performance of work under a NASA Contract and is subject to the provisions of Section 305 of the National Aeronautics & Space Act of 1958, Public Law 85-568 (72 STAT 435; 42 U.S.C. 2457).

BACKGROUND OF THE INVENTION

1. Field of the Invention

The invention generally relates to systems for modulating solar energy collected for a solar energy module, and more particularly to a solar energy flux modulator for modulating reflected solar energy from a full "on" to a full "off" value and intermediate values existing therebetween, as the solar energy is reflected toward an acceptance opening.

In conducting materials-testing operations utilizing the sun in conjunction with a parabolic dish mirror, or concentrator, as a source of thermal energy, it often is necessary to simulate reduced insolation such as that which is experienced under variable cloud-cover conditions, or when reduced temperatures are needed for test purposes. However, a standardization of insolation, as required in order to simulate reduced insolation, necessarily requires a provision of means for obtaining a standardized, selective control of solar flux between full "on" or full "off" positions.

2. Description of the Prior Art

During the course of a search conducted for the instant invention, the patents listed on the enclosed Form PTO-1449 were discovered. However, it is believed to be apparent that none of the references discovered during the course of the search disclose or even suggest the solar energy flux modulator hereinafter more particularly described and claimed.

It is therefore the general purpose of the instant invention to provide a method and a device for selectively modulating and thus controlling the quantity of solar energy flux received by a solar energy receiver employed in combination with a parabolic dish mirror, or the equivalent thereof.

OBJECTS AND SUMMARY OF THE INVENTION

It is an object of the instant invention to provide an improved method and device for controlling solar energy flux admitted to a solar energy receiver.

It is another object to provide a method for modulating solar flux delivered by a parabolic dish mirror to an acceptance opening for a solar energy receiver.

It is another object to provide a solar energy flux modulator for a solar energy receiver optically coupled with a parabolic dish mirror and characterized by an insolation acceptance opening having an axis coincident with the optic axis of the mirror.

It is another object to provide in combination with a module characterized by a receiver having a solar energy acceptance opening supported along the optic axis of a parabolic dish mirror in coaxial alignment therewith for receiving solar energy flux reflected from the surface of the mirror. A modulator for selectively varying the quantity of solar energy flux received by the acceptance opening.

These and other objects and advantages are achieved through the use of a solar flux modulator plate selectively movable in axial directions, interposed between the reflective surface of a parabolic dish mirror and a solar energy receiver having a solar flux acceptance opening characterized by an axis coincident with the optic axis of the mirror, as will become more readily apparent by reference to the following description and claims in light of the accompanying drawings.

DESCRIPTION OF THE DRAWINGS

FIG. 2 is a fragmented, perspective view of the solar energy receiver, but on an enlarged scale, depicting in more detail the solar energy flux modulator plate provided for varying the quantity of solar flux received at the acceptance opening for the receiver.

FIG. 3 is a diagrammatic view, not necessarily to scale, depicting the operation of the modulator embodying the principles of the instant invention.

FIG. 4 is a cross-sectional view taken generally along lines 4—4 of FIG. 3, illustrating an annular flux admittance zone established by the modulator shown in FIG. 3.

FIG. 5 is a diagrammatic view of an actuating system for the modulator.

DESCRIPTION OF THE PREFERRED EMBODIMENT

Figure 1:
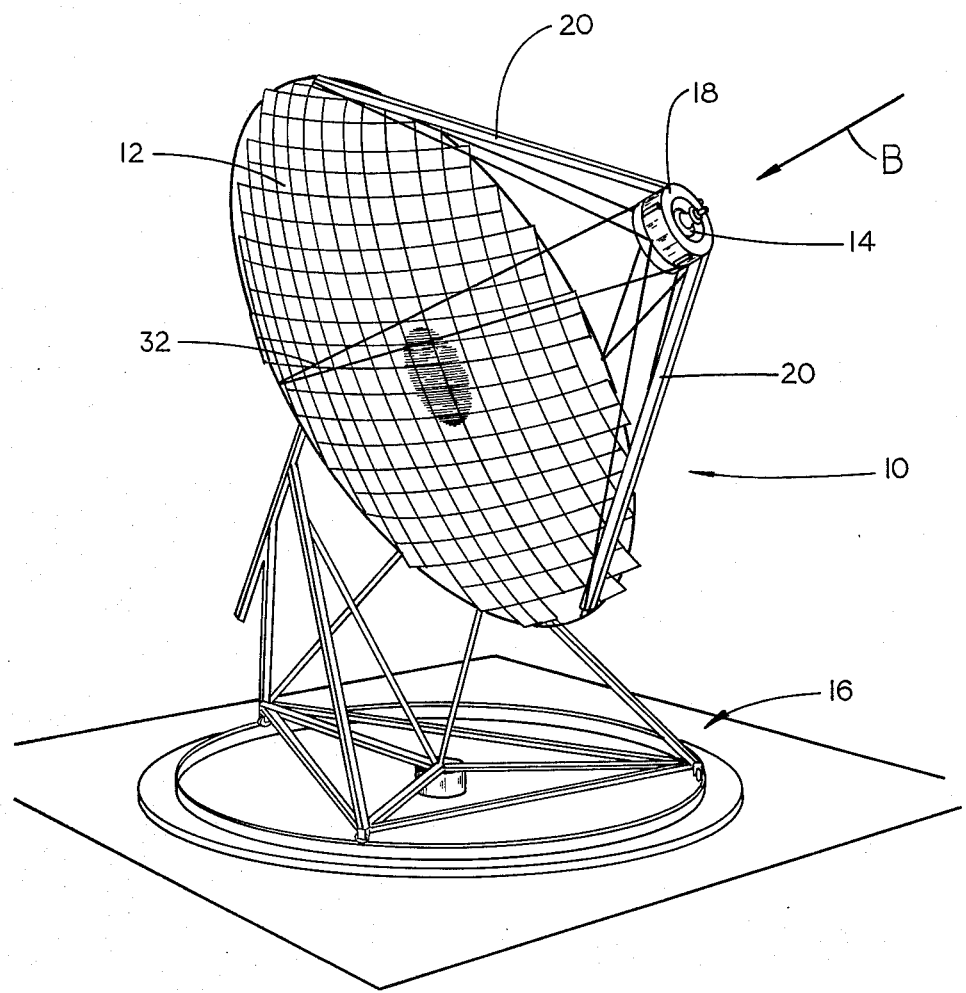
FIG. 1 is a pictorial view of a solar energy receiver optically coupled with a parabolic dish mirror having a solar flux modulator plate for variably shading an acceptance opening for the receiver in response to positional changes imposed thereon.

Referring now to the drawings, with more particularity, wherein like reference characters designate like or corresponding parts throughout the several views, there is shown in FIG. 1 a system 10 including a parabolic dish mirror 12 having a solar energy receiver 14 supported along the optic axis, not designated, of the mirror.

The mirror 12 of the system 10, as shown, is supported by suitable mounting superstructure of conventional design. Similarly, the receiver 14 is supported in suspension by a mounting ring 18 supported by suitable struts 20 connected with the superstructure 16 in a suitable manner. The receiver 14 also is of suitable design and includes an internal chamber equipped with a solar flux acceptance opening 22, through which the flux of solar energy is admitted to the receiver.

The receiver 14, in turn, is connected to the mounting ring 18 through suitable mounting links 24 having conventional pins and the like for effecting a desired coupling of the receiver and the mounting ring. Additionally, the mounting ring 18 is secured to the struts 20 utilizing stub shafts 26 welded to the external surface of the mounting ring and united with the struts 20 through mated mounting plates 30 bolted together in a suitable manner. Additionally, as shown, guys 32 are employed for stabilization purposes. It will, of course, be appreciated that the particular manner in which the receiver 14 is supported is, in practice, varied as desired. Similarly, it is to be understood that the receiver 14 is of a variable design dictated by the nature of its intended use. For example, because of the many end uses for solar thermal receivers, it is likely that certain uses will require that components operate in a pressurized environment. In such instances, an entrance opening adapted to allow pressurization of the internal cavity of the receiver may be required. Additionally, it may be desired that a radiation trap be employed to prevent radiant power from leaving the receiver by way of the acceptance opening, or entrance aperture, in order to enhance the thermal efficiency of the device. Moreover, a compact close-looped circuit for high-temperature working fluids may be required in order to effect a heat transfer within the receiver. Finally, depending upon the intended operation of the device, radiation absorbent materials or coatings applied to various surfaces of the device may be found useful in preventing dangerous reflections which may tend to be harmful to persons or equipment.

As shown in FIGS. 2 and 3, conduits 34 are provided for circulating a working fluid, such as water, through the receiver 14. The conduits 34 are, where so desired, coupled with a heat exchanger 36, FIG. 2, of suitable design. A pump and motor unit 38, also of suitable design are, where desired, provided for circulating the working fluid through the heat exchanger.

In view of the foregoing, it is believed to be readily apparent that the specific design of the receiver 14 will vary, depending upon the mission of the receiver and its environment. Therefore, a detailed description of the receiver 14 is omitted in the interest of brevity.

Similarly, it is believed to be sufficient to understand that the axis of the solar flux acceptance opening 22 is coincident with the optic axis of the mirror 12, FIG. 3. Moreover, the acceptance opening 22 is so spaced from the surface of the mirror 12 a distance such as to locate the focal point F.PT. of the mirror 12 just inside the acceptance opening 22, as indicated in FIG. 3.

As shown in FIG. 1, the receiver 14 is supported by the superstructure in a position such that a beam B of solar radiation is projected from the sun causing individual parallel rays, designated $R_1-R_6$, FIG. 3, to be reflected by the surface of the mirror 12 toward the solar flux acceptance opening 22. A shade plate 40 preferably is provided atop the mounting ring 18. The outside diameter of the shade plate is slightly greater than the outside diameter of the mounting ring 18 to produce a shade zone SZ concentric with the axis A. The shade zone SZ comprises a three-dimensional space through which no insolation is returned by the surface of the mirror to the acceptance opening 22. Rays $R_1-R_6$, striking surface areas of the surface of the mirror outside the shade zone are directed toward the acceptance opening 22 of the receiver and the rays are brought into focus at the focal plane of a solar flux, preferably located at the acceptance opening 22.

A solar flux modulator plate 42 of an annular configuration is supported in coaxial alignment with the solar flux acceptance opening 22 by a plurality of selectively energizable motors. As shown, fluid-actuator slave cylinders 44, only two of which are shown in FIG. 2, are employed for this purpose. Of course, the particular arrangement and number of the slave cylinders 44 employed may be varied as desired. Additionally, whether the slave cylinders 44 are pneumatic, hydraulic, or comprise electrically or mechanically driven devices, such as motors, is deemed to be a matter of convenience only. Therefore, a detailed description of the slave cylinders is omitted in the interest of brevity, it being understood that the function thereof simply is to axially displace the plate 42 upon command.

As shown in FIG. 5, however, the slave cylinders 44 comprise double-acting fluid cylinders controlled through a bank of valves 46 by a suitable, selectively operable control circuit 48. As a practical matter, the control circuit 48 is designed to respond to sensed ambient conditions, or alternatively, designed to be remotely controlled. The particular circuitry employed in this circuit forms no part of the instant invention. However, it will be understood that suitable control switches, not shown, having alternate functional positions designated by indicia are provided in order to assist in the selective positioning of the plate. Since such is well within the purview of the art and may be varied as required for compatability with the motors employed, a detailed description thereof is omitted. Additionally, while a source of fluid, designated 50, is included in the circuit, this also is varied as dictated by the operational requirements of the system.

In any event, it is to be understood that the modulator plate 42 is supported by the slave cylinder for axial displacement relative to the axis A, from an initial position IP through intermediate positions represented by dashed lines and indicated by the letters IMP, to a final position, designated FP, FIG. 3. It is important to note that the modulator plate 42 comprises an annular planar member having an outside diameter substantially equal to the outside diameter of the shade plate 40 and an internal diameter equal to or slightly greater than the diameter of the solar flux acceptance opening 22. Hence, the modulator plate 42 performs a shading function whereby there is defined about the shade zone SZ a solar energy admittance zone AZ of an area which is caused to vary in response to axial repositioning of the modulator plate along the axis A, as indicated in FIG. 3.

While only three positions for the modulator plate 42 are illustrated in FIG. 3, it is to be understood that any number of intermediate positions are provided for between the initial position IP at which maximum quantities of flux are passed from the mirror surfaces to the solar flux acceptance opening, and a final position FP at which no solar flux is passed to the solar flux acceptance opening. Consequently, the modulator plate 42 may be deemed to be in a full "on" disposition at the initial position IP, and a full "off" disposition when in the final position FP. Between the full "on" and full "off" disposition, the modulator plate may assume any one of numerous intermediate positions IP for varying the quantity of flux. Of course, the full "off" disposition of the modulator plate may be utilized as an emergency "shut-off" for completely shading the solar flux acceptance opening in order to prevent malfunction or damage to persons or equipment.

Finally, because of its interception of insolation, it is preferred that the modulator plate 42 protectively be water-cooled, as well as to be coated with a heat-absorbant coating to prevent reflection of the insolation which may tend to be harmful to both personnel and equipment.

OPERATION

It is believed that in view of the foregoing description, the operation of the invention herein disclosed and claimed is readily apparent, however in the interest of completeness, the operation of the disclosed invention is at this point briefly reviewed.

With the system 10 assembled in the manner hereinbefore described, its operation is believed to be readily apparent. With the receiver 14 aligned along the axis A of the parabolic mirror 12, and at a distance from the surface of the mirror such that the focal point FP of the mirror is adjacent to or slightly within the solar flux acceptance opening 22, the system 10 is readied for operation.

In practice, when the modulator plate 42 is retracted in response to a restarting manipulation of the slave cylinders 44 to the initial position IP, rays of solar energy falling on the surface of the mirror 12 are reflected through the admittance zone AZ to the acceptance opening 22 and pass through the focal plane of the mirror to the interior of the receiver 14. By varying the position of the modulator plate 42 axially through its various intermediate positions, indicated IMP, the area of the admittance zone AZ, about the shade zone SZ, is varied for thereby varying the quantity of solar flux delivered to the receiver 14 via the solar flux acceptance opening 22. Of course, such is achieved through the circuit 48 control mechanism. When the modulator plate 42 is positioned at its final position FP, FIG. 3, the diameter of the conical-shaped shade zone SZ in the plane of the modulator plate 42 equals the internal diameter of the modulator plate for thus substantially eliminating the admittance zone AZ. Consequently, the plate 42 is in its full "off" position at which no insolation may pass to the solar flux acceptance opening 22.

Of course, increased quantities of solar flux may be admitted through the admittance zone AZ as the slave cylinders 44 are energized for retracting the modulator plate 42 through the various intermediate positions IMP as the plate moves toward its initial position IP at which the plate again assumes a full "on" disposition.

Another application for the instant invention is the control of solar power to enable load-matching in solar thermal electric generating plants. This control capability would facilitate regulating the solar power during the daytime to compensate for time-varying demand in the connected grid system. By designing the system to operate with the modulator plate admitting less than full flux, system compliance can readily be provided to allow for higher load conditions or for lower insolation caused by cloud cover or diurnal solar radiation conditions.

In view of the foregoing, it is believed that the instant invention provides a practical solution to the problems encountered when attempting to simulate reduced insolation such as that experienced under variable cloud-cover conditions, or when reduced temperatures are needed for test purposes. Consequently, through the instant invention there is provided a practical method and device for controlling solar flux on a selective basis whereby standardization of insolation is facilitated.

What is claimed is:

1. A solar energy flux modulator for a solar energy receiver optically coupled with a parabolic dish mirror and characterized by a solar flux acceptance opening having an axis coincident with the optic axis of the mirror, comprising:
   A. a solar flux modulator plate interposed between said mirror and said receiver and having a central opening concentric with said axis;
   B. means for establishing along said optical axis a graduated shade zone from said flux opening and toward said mirror; and
   C. moveable support means for displacing said modulator plate from a first minimum shade position adjacent said acceptance opening to a second and more shaded position remote from said acceptance opening, while maintaining the concentricity of said central opening with said axis.

2. A solar energy flux modulator as defined in claim 1 wherein said receiver is supported in interposed relation with a source of solar radiation and said mirror to form said graduated shade zone of a conical configuration coaxially aligned with the insolation acceptance opening of the receiver and having an apex defined at the focal point of said mirror, said focal point being positioned within said acceptance opening, and wherein the central opening of said modulator plate defines a flux admittance zone of an annular configuration concentrically related to said shade zone, the area of the flux admittance zone being varied in response to axial displacement of the flux modulator plate relative to said axis.

3. A solar energy flux modulator as defined in claim 1 further comprising a mounting ring for supporting said receiver, a plurality of struts for supporting said mounting ring along the optic axis of the mirror, and wherein said motor means comprises a plurality of slave cylinders having axially extensible shafts supporting said flux modulator plate in suspended relation with respect to said mounting ring.

* * * * *